US012686266B2

(12) United States Patent
Hayes

(10) Patent No.: US 12,686,266 B2
(45) Date of Patent: Jul. 21, 2026

(54) PUMP SYSTEM FOR LIQUID TRANSPORT TANK

(71) Applicant: Roger Hayes, Adelanto, CA (US)

(72) Inventor: Roger Hayes, Adelanto, CA (US)

(*) Notice: Subject to any disclaimer, the term of this patent is extended or adjusted under 35 U.S.C. 154(b) by 0 days.

(21) Appl. No.: 18/905,859

(22) Filed: Oct. 3, 2024

(65) Prior Publication Data

US 2025/0115121 A1     Apr. 10, 2025

Related U.S. Application Data

(60) Provisional application No. 63/588,940, filed on Oct. 9, 2023.

(51) Int. Cl.
| | |
|---|---|
| *B60K 25/06* | (2006.01) |
| *B05B 9/04* | (2006.01) |
| *F04D 13/02* | (2006.01) |

(52) U.S. Cl.
CPC ............ *B60K 25/06* (2013.01); *B05B 9/0416* (2013.01); *F04D 13/02* (2013.01)

(58) Field of Classification Search
CPC ........ B60K 25/06; B05B 9/0416; F04D 13/02
See application file for complete search history.

(56) References Cited

U.S. PATENT DOCUMENTS

| | | | | |
|---|---|---|---|---|
| 9,625,915 | B2 * | 4/2017 | McLoughlin | A62C 37/36 |
| 2004/0045547 | A1 * | 3/2004 | Yamamoto | B05B 17/0638 |
| | | | | 128/200.14 |
| 2016/0252063 | A1 * | 9/2016 | Mordukhovich | F04C 14/08 |
| | | | | 417/364 |
| 2017/0002819 | A1 * | 1/2017 | Wahl | F04D 7/00 |
| 2017/0230996 | A1 * | 8/2017 | Li | H04W 72/20 |
| 2018/0230996 | A1 * | 8/2018 | Crowder | F04C 14/28 |
| 2019/0224508 | A1 * | 7/2019 | Laskaris | G06F 3/0488 |
| 2020/0025180 | A1 * | 1/2020 | LaMuth | F03B 17/00 |
| 2022/0402165 | A1 * | 12/2022 | Calculli | B28C 5/4213 |
| 2025/0003417 | A1 * | 1/2025 | Buthmann | F04D 7/06 |

FOREIGN PATENT DOCUMENTS

| | | | |
|---|---|---|---|
| CN | 117167451 A | * | 12/2023 |
| JP | 2006273118 A | * | 10/2006 |

OTHER PUBLICATIONS

English Translation CN-117167451-A (Year: 2023).*
English Translation JP-2006273118-A (Year: 2006).*

* cited by examiner

*Primary Examiner* — Shafiq Mian
(74) *Attorney, Agent, or Firm* — KNOBBE, MARTENS, OLSON & BEAR, LLP

(57) ABSTRACT

A pump system is configured to couple to a power take-off of a vehicle and includes a pump having a drive shaft. The drive shaft has a first end and a second end. The first end engages with the power take-off of the vehicle and the second end drives a pump disposed under the vehicle.

19 Claims, 17 Drawing Sheets

74

68

PUMP SYSTEM FOR LIQUID TRANSPORT TANK

CROSS-REFERENCE TO RELATED APPLICATION

This application claims benefit under 35 U.S.C. 119(e) to U.S. Provisional Patent App. No. 63/588,940, filed Oct. 9, 2023, the entire disclosure of which is hereby incorporated by reference herein in its entirety. Any and all priority claims identified in the Application Data Sheet, or any corrections thereto, are hereby incorporated by reference under 37 CFR 1.57.

FIELD

This disclosure generally relates to pump systems for vehicles used for transporting and spraying liquids. The pump system is driven by the engine of the vehicle to spray liquid from a tank. More specifically, the pump system is directed to a pump configured to be driven by a power take-off of a transmission.

BACKGROUND

Tank carrying vehicles are used to transport liquids. The vehicle can include a pump designed to pump the liquid from inside a tank and spray or expel the pumped liquid at high pressure. The pump is accessible outside the vehicle and driven by a hydraulic system.

SUMMARY

The devices of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description," one will understand how the features of this invention provide several advantages over current designs.

An aspect of the present disclosure provides a pump system configured to couple to a power take-off of a vehicle. The pump system includes a pump having a drive shaft, the drive shaft having a first end and a second end, the first end being configured to engage with the power take-off of the vehicle, the second end being configured to drive the pump, the pump being sized and shaped to be disposed under the vehicle.

Additional aspect include an adapter configured to secure the pump system to the power take-off.

Additional aspect include a housing.

Additional aspect include, wherein the housing comprises a plate and a casing.

Additional aspect include an impeller.

Additional aspect include, wherein the impeller comprises a rotating disk and a plurality of vanes.

Additional aspect include, wherein the pump is a centripetal pump.

Additional aspect include, wherein the pump is a rotary pump.

Additional aspect include, wherein the pump further comprises a removable cover.

Additional aspect include a bearing disposed about the shaft.

Additional aspect include a spacer disposed about the shaft.

An aspect of the present disclosure provides a pump system configured to couple to a power take-off of a vehicle. The pump system includes a pump having a drive shaft and a liquid end, the drive shaft having a first end and a second end, the first end being configured to engage with the power take-off of the vehicle, the second end being configured to engage with the liquid end so as to drive an impeller, the pump being sized and shaped to be disposed under the vehicle.

Additional aspect include, wherein the impeller comprises a rotating disk and a plurality of vanes.

Additional aspect include, wherein the pump is a centripetal pump.

Additional aspect include, wherein the pump is a rotary pump.

An aspect of the present disclosure provides a pump system configured to couple to a power take-off of a vehicle, the pump system including a drive shaft having a first end and a second end, the first end being configured to engage with the power take-off of the vehicle, a pump having an impeller, the impeller being driven by the second end of the drive shaft, a pump inlet pipe configured to route water from a tank on the vehicle to the impeller, and an outlet pipe configured to route the water exiting the pump to one or more control valves of the vehicle.

Additional aspect include, wherein the pump system has a compact size configured to fit under the vehicle.

Additional aspect include the power take-off, wherein the power take-off is configured to engage with a transmission of the vehicle.

Additional aspect include, wherein the power take-off and the pump system are aligned so as to rotate about a common axis.

Additional aspect include, wherein the power take-off attaches to the transmission via one or more fasteners and engages with one or more gears of the transmission.

Further aspects, features and advantages of the present invention will become apparent from the detailed description that follows.

BRIEF DESCRIPTION OF THE DRAWINGS

Various examples are depicted in the accompanying drawings for illustrative purposes and should in no way be interpreted as limiting the scope of the examples. Various features of different disclosed examples can be combined to form additional examples, which are part of this disclosure.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
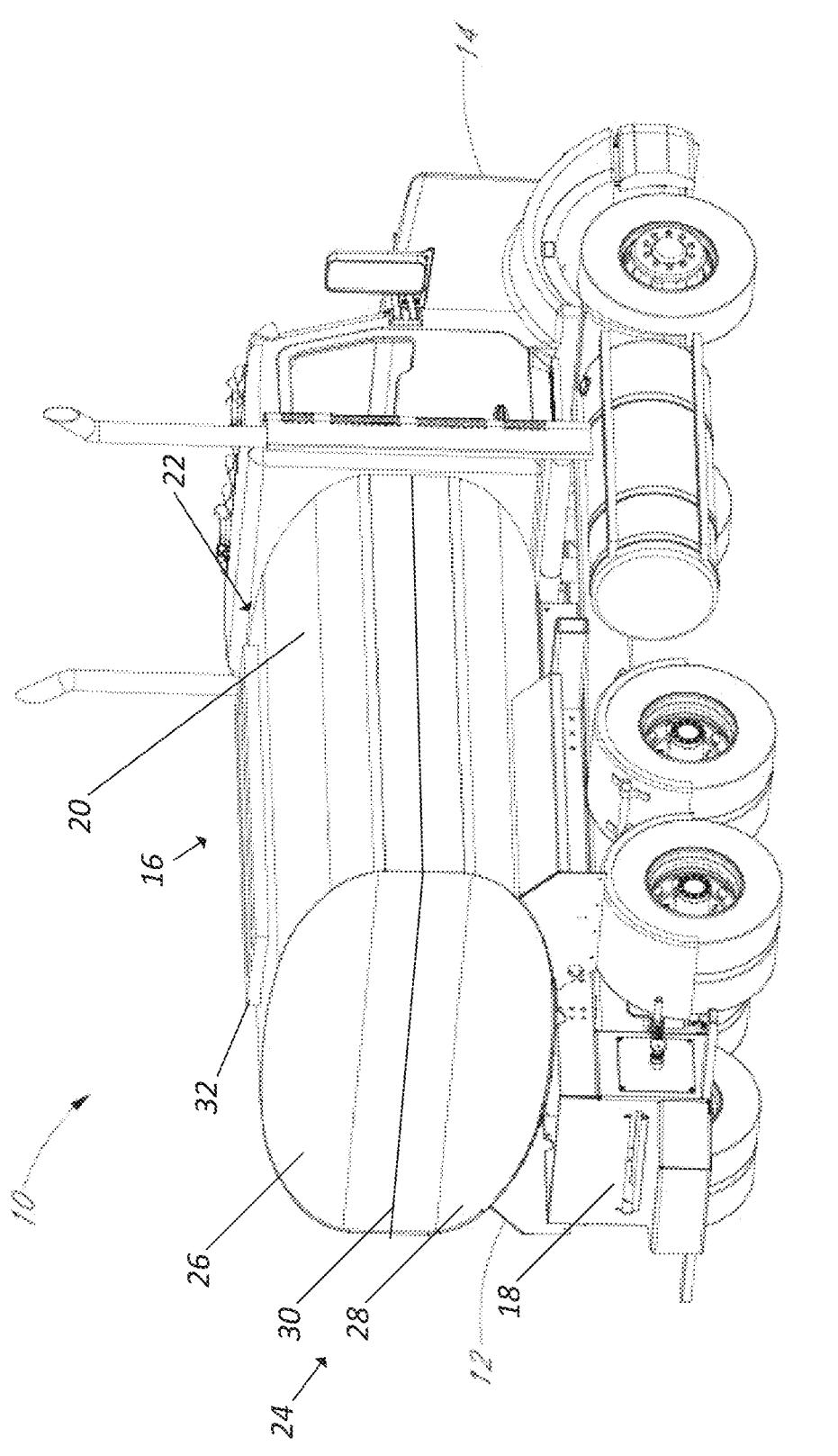
FIG. 1 is a perspective view of a truck including a tank body supported by a chassis according to a preferred embodiment of the present disclosure.
Figure 2:
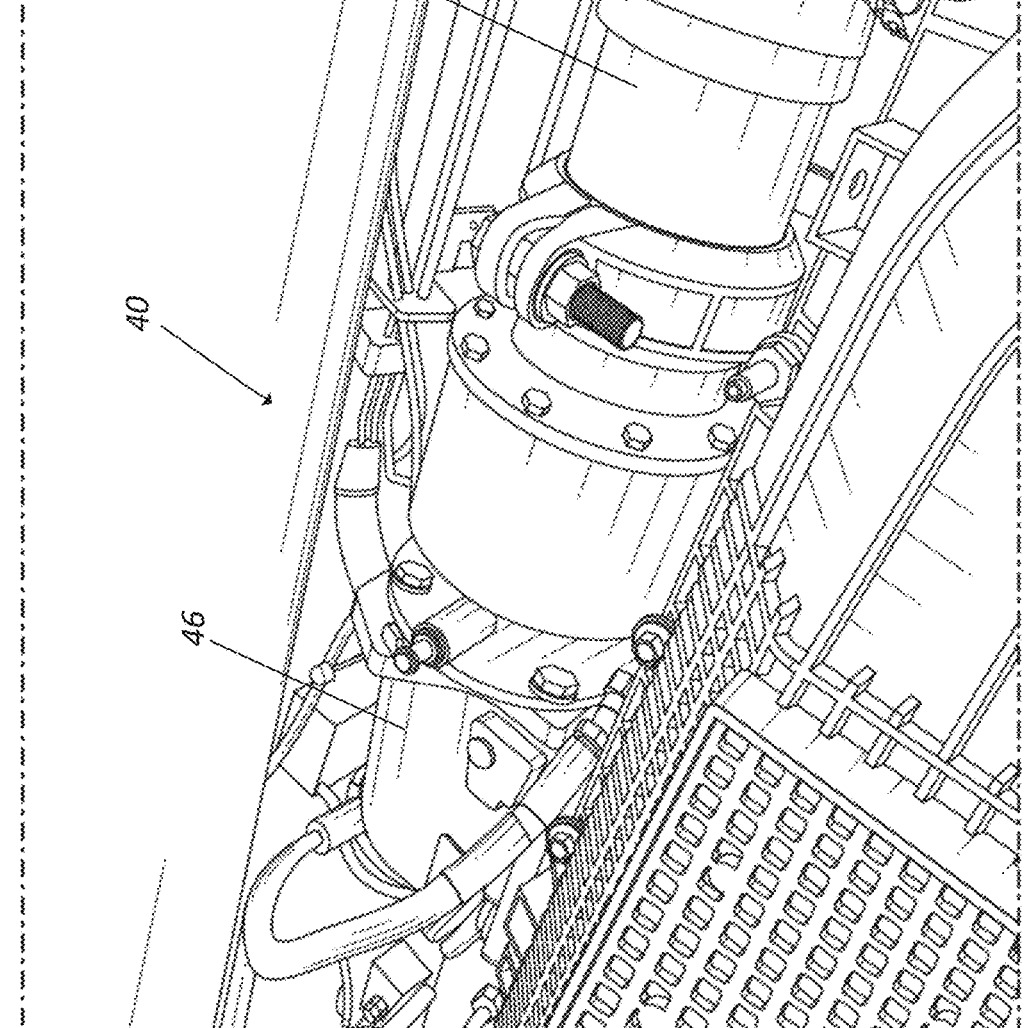
FIG. 2 is a perspective view of a pump system coupled to a transmission of the truck via a power take-off.

FIG. 1 is a perspective view of a truck 10 including a tank body 12 supported by a chassis 14. The truck 10 can be a motor vehicle or other transportation means. FIG. 2 is a perspective view of a pump system 40 coupled to a transmission 15 of the truck 10 via a power take-off (PTO) 46. The Power take-off (PTO) 46 transfers the engine's mechanical power to the pump system 40. In certain embodiments, the pump system's 40 drive shaft is connected to the truck's PTO stub shaft and transfers energy from the truck 10 to the pump system 40. In certain embodiments, the tank body 12 can comprise a tank 16 supported by a frame 18.

The tank 16 can have various uses. For example, the tank 16 can be used in the petroleum industry for the storage or transportation of fuel or oil in liquid form. Other exemplary uses include storage or transportation of liquids in the farming, forestry, construction, mining, chemical, water, or other industries.

In certain embodiments, the tank 16 can rest on the frame 18. In certain embodiments, the tank 16 can be attached to the frame 18, either permanently or temporarily. In this way, in certain embodiments, the frame 18 can be used for supporting, storing and/or transporting the tank 16.

In certain embodiments, the tank 16 includes an outer wall 20. In certain embodiments, the outer wall 20 can encase an interior space forming a receptacle. The receptacle can be used for storage of a liquid. The outer wall 20 can contain the liquid. The receptacle can optionally be filled with the liquid and emptied of the liquid as explained below.

In certain embodiments, the outer wall 20 can include a plurality of panels. In certain embodiments, the outer wall

20 is 10 gauge. In certain embodiments, the panels can be curved and/or flat regions that together form the outer wall 20 that encloses the receptacle. The outer wall 20 can have a form factor. The form factor can generally be or include rectangular, circular, hexagonal, elliptical, polygonal, irregular, or any other suitable prism shapes.

In certain embodiments, the outer wall 20 can form a one-piece tank or a multi-piece tank as explained below. In embodiments of a multi-piece tank as is illustrated in FIG. 1, the outer wall 20 is formed into the shape of the tank 16. For example, in certain embodiments, the tank 16 can be manufactured to include a front head 22 and a rear head 24 welded to a central body.

In certain embodiments of the tank 16, the outer wall 20 can comprises a top portion 26 and a bottom portion 28. The top portion 26 and the bottom portion 28 can cooperate to enclose the receptacle. For example, the top portion 26 and the bottom portion 28 can be welded together along with the front head 22 and the rear head 24 to form a one-piece tank.

In certain embodiments, the top portion 26 and the bottom portion 28 can each include a singular piece and/or a single material. In certain embodiments, the top portion 26 and the bottom portion 28 can include steel, stainless steel, galvanized steel, plastic, aluminum, fiberglass, Strenex, chrome-ally, galvanneal, enduraplas, or any other suitable material.

In certain embodiments, the top portion 26 and the bottom portion 28 can be formed out of a plurality of connected panels. In some implementations, the material of the top portion 26 can be the same as the material of the bottom portion 28. In other implementations, the top portion 26 can be a different material than the bottom portion 28. In certain embodiments, the bottom portion 28 is a steel or stainless steel and the top portion 26 is a fiberglass material. In another embodiment, the bottom portion 28 is a stainless steel and the top portion 26 is a steel. Any other combination of the above materials, including other materials not listed herein, is contemplated herein.

In certain embodiments, the top portion 26 and the bottom portion 28 can connect at an interface 30. In certain embodiments, the interface 30 can extend along a horizontal plane dividing the top portion 26 from the bottom portion 28. In other embodiments, the interface 30 can be located within multiple different planes. In other embodiments, the interface 30 can include multiple protrusions and interlocking valleys. In other embodiments, the interface 30 can be located within a non-horizontal plane.

In certain embodiments, the top portion 26 and the bottom portion 28 can be permanently attached together at the interface 30 such as by welding, or releasably attached at the interface 30 such as with mechanical fasteners to connect and/or otherwise releasably seal together the top portion 26 and the bottom portion 28. Mechanical fasteners can include, for example, nuts and bolts.

In certain embodiments, the tank 16 can include an opening 32. The opening 32 can extend through the outer wall 20 into the receptacle. In certain embodiments, the opening 32 can be in the shape of a square, rectangular, or other shape. The opening 32 can provide a pathway for filling a liquid within the tank 16. In certain embodiments, the opening 32 can be used in conjunction with a lid or plug for enclosing the tank 16 to contain liquid therein.

In certain embodiments, the tank 16 can also include a drain in the bottom portion 28. In certain embodiments, a diameter of the drain can be sized to provide sufficient flow to feed the pump system 40. In certain embodiments, liquid from inside the tank 16 is drawn from the drain and into a liquid end 42 (see FIG. 14) of the pump system 40 via the drain outlet.

Figure 3:
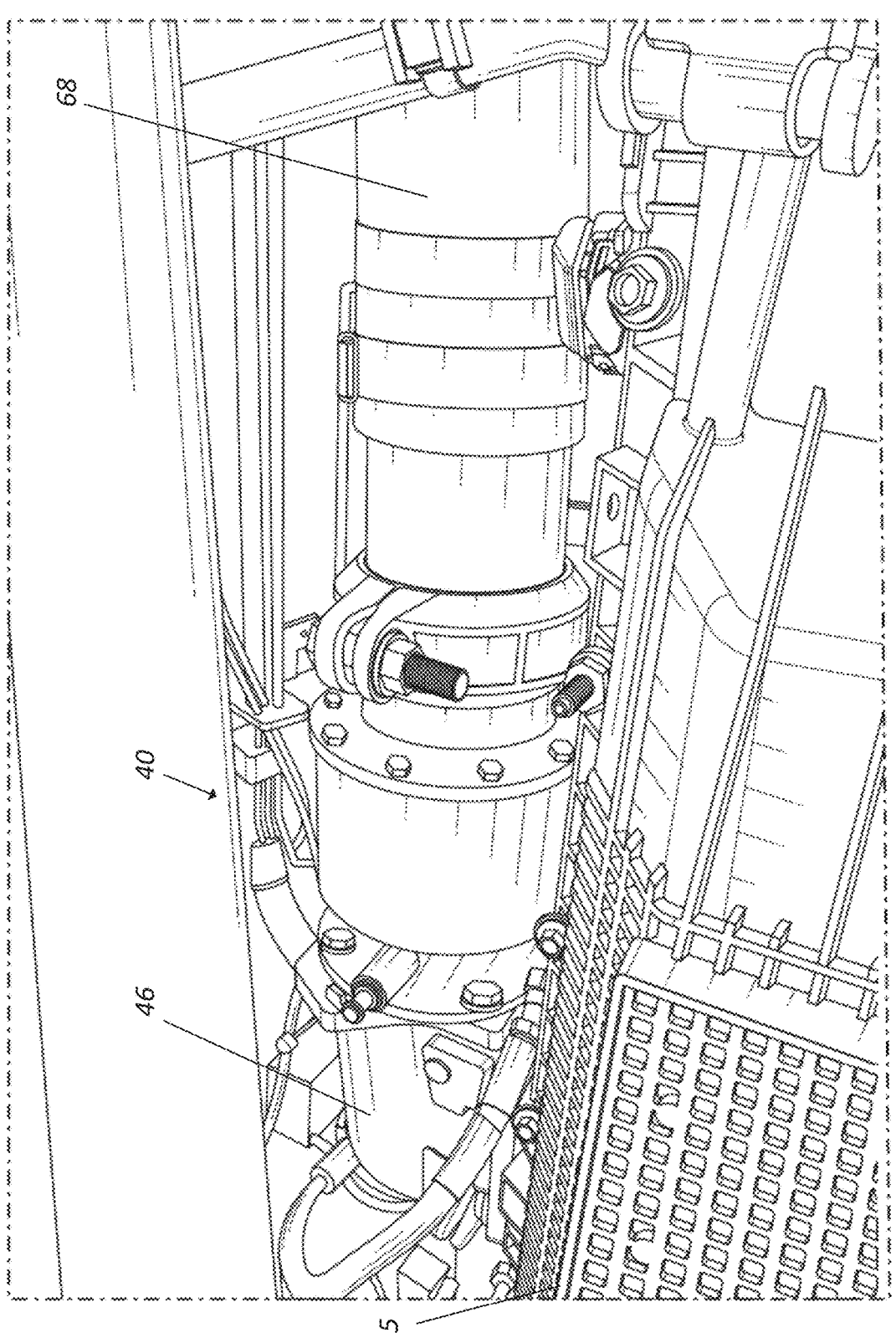
FIG. 3 is another perspective view of the pump system from FIG. 2.
Figure 4:
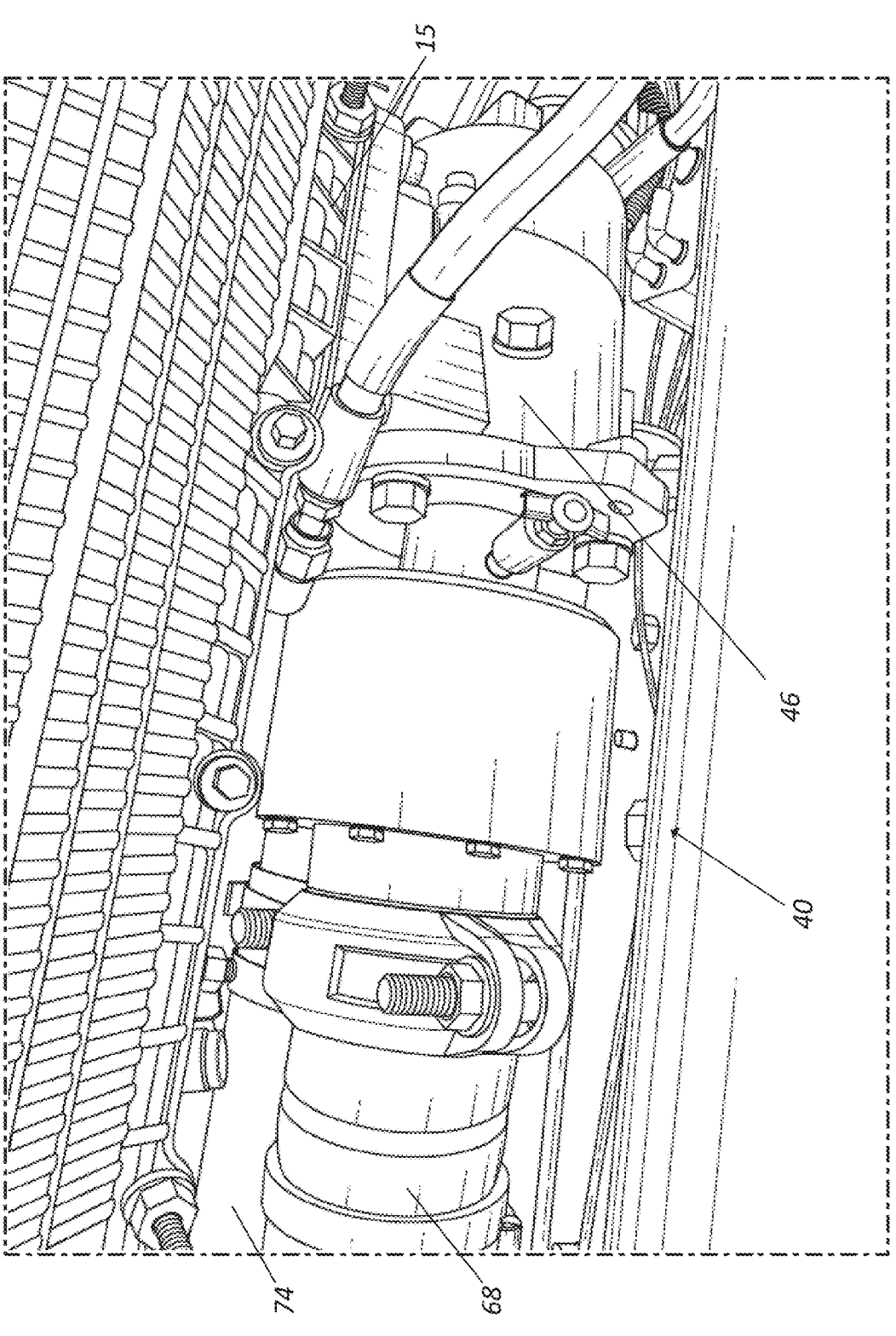
FIG. 4 is another perspective view of the pump system from FIG. 2 showing a pump inlet pipe connected to the pump system.

FIGS. 3 and 4 are perspectives views of the pump system 40 from FIG. 2 showing a pump inlet pipe 68 connected to the pump system 40. In certain embodiments, the pump system 40 can include any type of pump, for example, a positive displacement pump, a centripetal pump, a centrifugal pump, or an axial-flow pump. In certain embodiments, a positive displacement pump moves fluid by trapping a fixed amount and forcing or displacing that trapped volume into a pump outlet pipe 74. In certain embodiments, a centrifugal pump changes a direction of flow of the fluid by ninety degrees as the fluid flows over an impeller. In an axial flow pump, the direction of flow is unchanged through the pump. The embodiment of the pump system 40 illustrated in FIG. 3 is a centripetal pump. Further, the illustrated pump is a single-stage pump. Of course, the disclosure is not limited to the pump system 40 being a centripetal pump or single-stage. The pump system 40 can be any type of pump useful for converting rotational energy to energy in a moving fluid known to a person having ordinary skill in the art.

Figure 14:
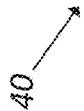
FIG. 14 is a cross-section view along lines 14-14 in FIG. 13.

In certain embodiments, the pump system 40 includes the liquid end 42 and a power frame 44 (FIG. 14). In certain embodiments, the liquid end 42 and the power frame 44 are set up in a direct drive configuration.

Figure 5:
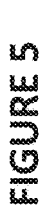
FIG. 5 is an end view of the pump system from FIG. 2 showing a pump outlet pipe of the pump system located above the pump inlet pipe.

FIG. 5 is an end view of the pump system 40 from FIG. 2 showing the pump outlet pipe 74 of the pump system 40 located above the pump inlet pipe 68. In certain embodiments, the power frame 44 includes the power take-off (PTO) 46. The power take-off 46 is configured to provide rotational energy to the liquid end 42 of the pump system 40. In certain embodiments, the power take-off 46 can take power from a power source, such as a running engine, and transmit it to the liquid end 42 of the pump system 40. In certain embodiments, the power take-off 46 comprises a splined drive shaft installed on the truck 10 allowing the pump system 40 with mating fittings to be powered directly by the engine of the truck 10.

Figure 6:
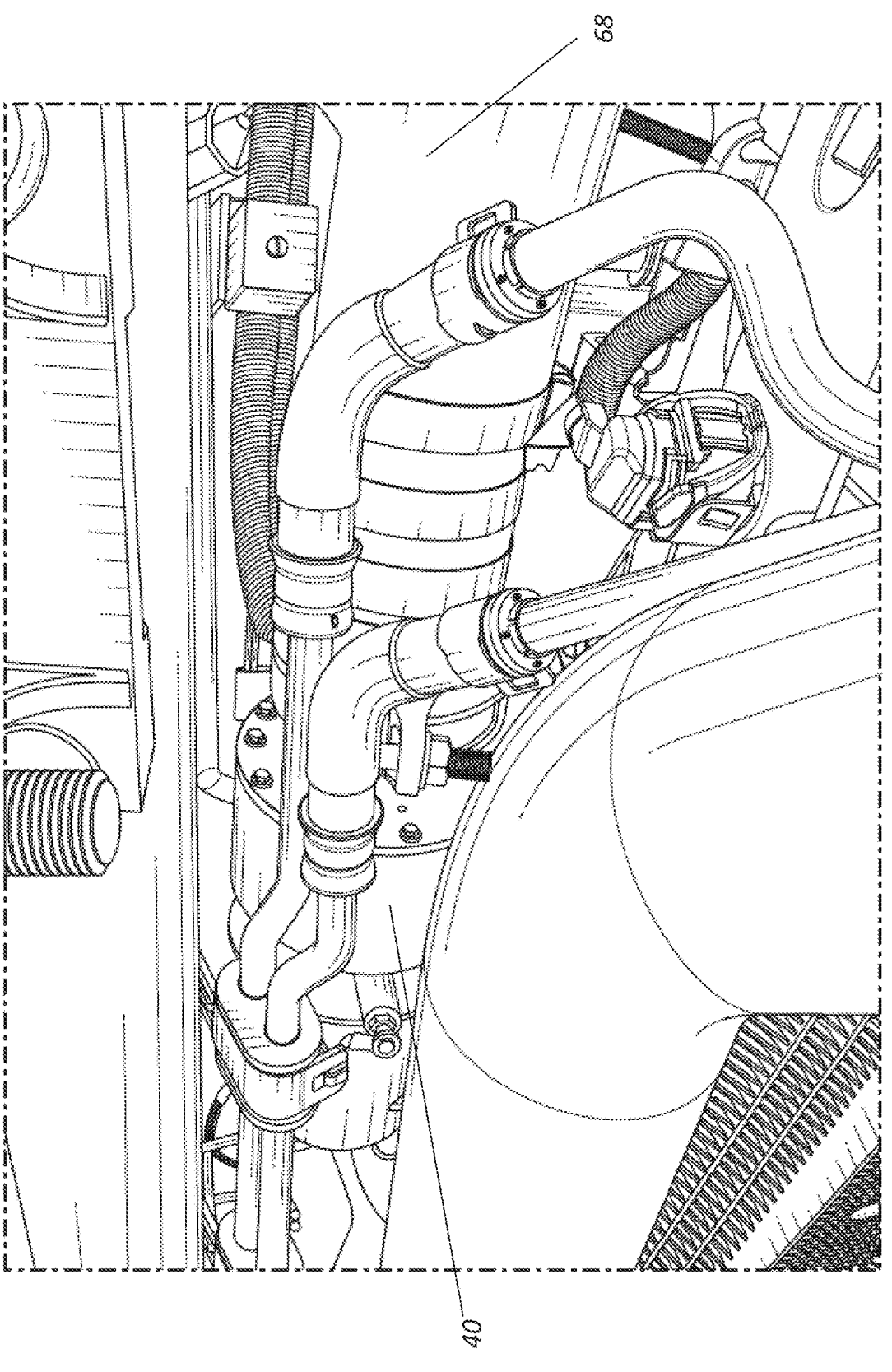
FIG. 6 is another perspective view of the pump system from FIG. 2.
Figure 7:
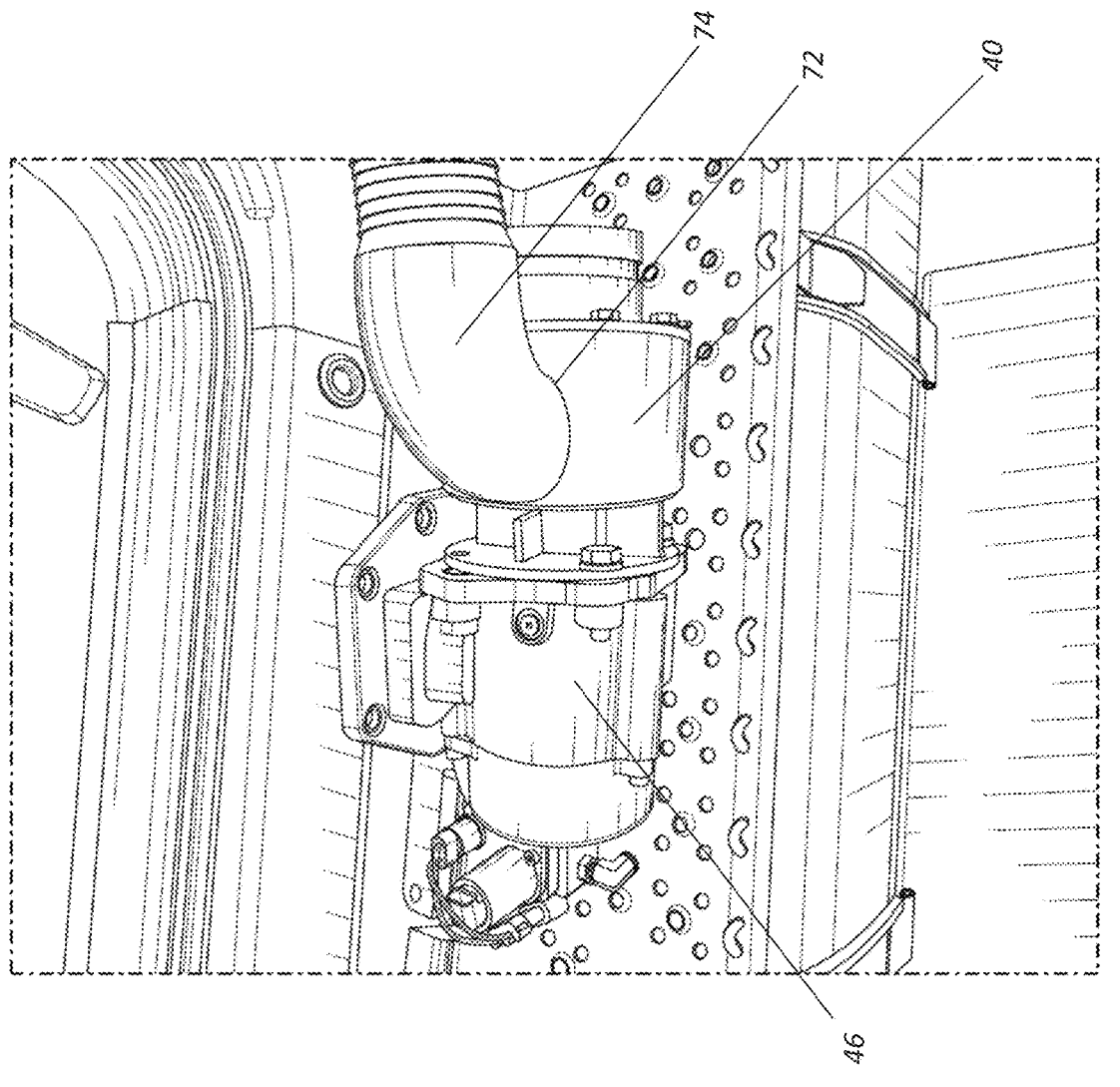
FIG. 7 is a perspective view of the pump system and the power take-off removed from the transmission of the truck.
Figure 8:
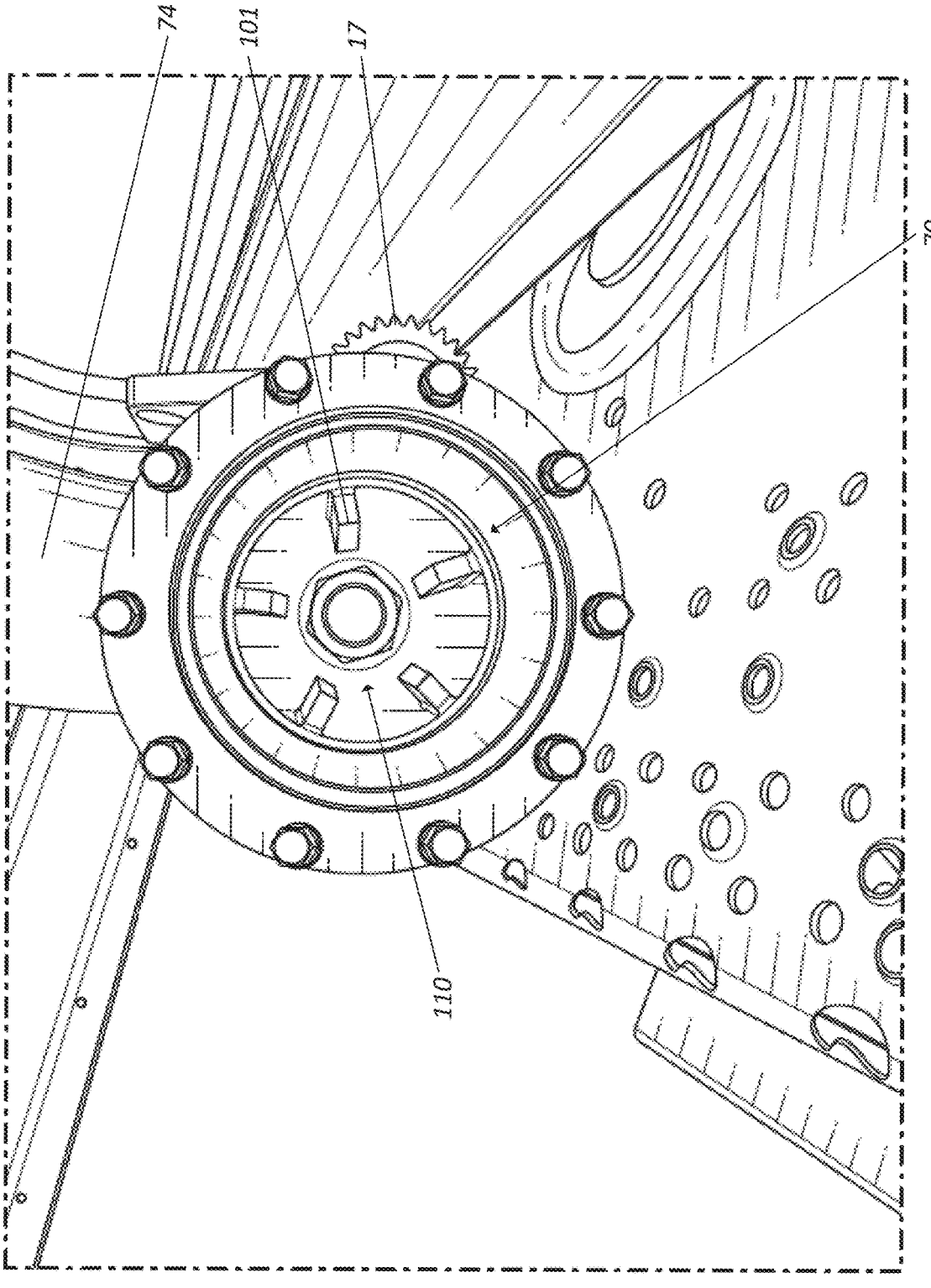
FIG. 8 is an end view of an inlet to the pump system showing an impeller that has a plurality of vanes.

FIG. 6 is another perspective view of the pump system 40 from FIG. 2. FIG. 7 is a perspective view of the pump system 40 and the power take-off 46 removed from the transmission 15 of the truck 10. The power take-off 46 in the embodiment of the pump system 40 illustrated in FIG. 7 engages the engine of the truck 10 via the transmission 15. For example, in certain embodiments, the power take-off 46 engages the transmission 15 via one or more gears 17 (FIG. 8). This disclosure contemplates the pump system 40 being co-located together in a compact form factor adjacent to the engine/transmission. In this way, there is no need to locate a pump on the frame 18 or chassis 14 of the truck 10 as the pump is directly coupled to and in proximity of the power take-off 46.

In certain embodiments, locating the pump system 40 on the transmission 15 can reduce manufacturing costs and assembly time of traditional pump installations. In this way, in certain embodiments, the reliability of the pump system 40 when operated on the transmission 15 is improved.

FIG. 8 is an end view of an inlet to the pump system 40 showing an impeller 110 that has a plurality of vanes 101. In certain embodiments, the power take-off 46 transfers work off the engine via the transmission 15 to the pump system 40. In certain embodiments, the power take-off 46 applies the mechanical power to the liquid end 42 of the pump system 40 via a drive shaft 92 (see FIG. 14). In certain embodiments, the mechanical power is used to drive the impeller 110 of the liquid end 42 through the drive shaft 92. In this way, the work of the engine pumps the liquid from the tank 16. The drive shaft 92 is rotated by the power take-off 46 on one end which rotates the liquid end 42 of the pump system 40 at the opposite end of the drive shaft 92.

In certain embodiments, the impeller 110 can comprise aluminum, plastic, cast iron, bronze, or any other material. In certain embodiments, the impeller 110 is cast aluminum. In certain embodiments, the selection of material for the impeller 110 may be dictated in part by requirements for corrosion, erosion and/or cavitation resistance.

In certain embodiments, the truck 10 and/or the pump system 40 includes a control which allows the user to adjust the output from the power take-off 46. In certain embodiments, a clutch is employed to adjust the output from the power take-off 46.

Figure 9:
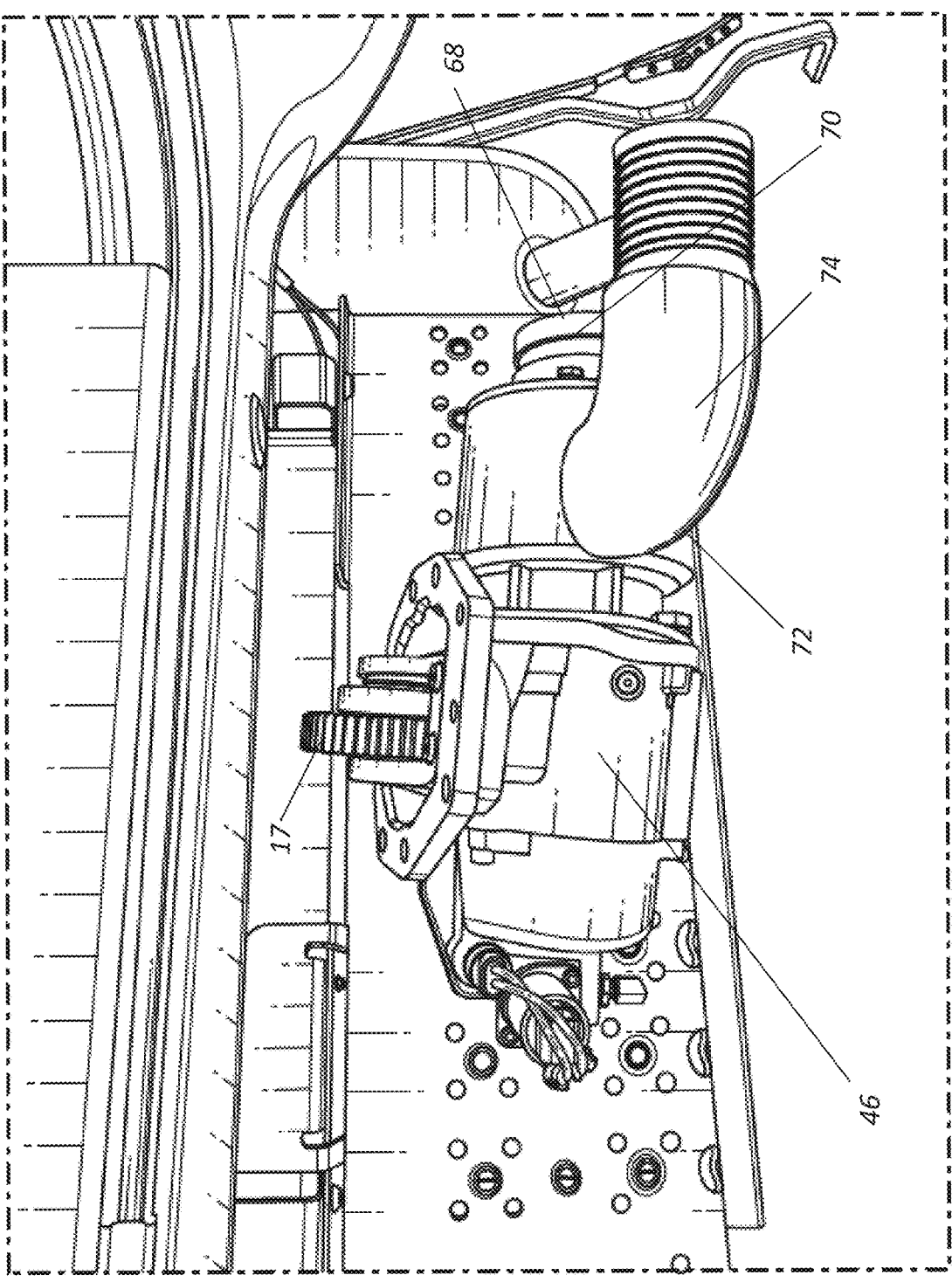
FIG. 9 is another perspective view of the pump system and the power take-off removed from the transmission of the truck.

FIG. 9 is another perspective view of the pump system 40 and the power take-off 46 removed as an assembly from the transmission 15 of the truck 10. In certain embodiments, the flow of liquid from the tank 16 is drawn from the tank 16 via a tank outlet. More specifically, in certain embodiments, gravity in combination with rotation of the impeller 110 draws the liquid from the tank 16. In certain embodiments, the flow entering the tank outlet then passes through a valve before entering the pump inlet pipe 68. In this way, in certain embodiments, a user can control the volume of liquid flowing from the tank 16 to the pump inlet pipe 68. Of course, the described pipes and their connections are only exemplary and other arrangements of pipes are contemplated and fall within the disclosure herein.

In certain embodiments, the flow from the pump inlet pipe 68 enters the liquid end 42 of the pump system 40 via a pump inlet 70. The pump inlet pipe 68 and the pump inlet 70 can be connected via any conventional means known in the art.

In certain embodiments, the pump system 40 includes a centripetal pump for delivering the liquid at high pressure. In certain embodiments, the pump system 40 further includes a pump outlet 72 for the high pressure liquid. In this way, in certain embodiments, the pressure of the liquid exiting the pump outlet 72 is higher than the pressure of the liquid entering the pump inlet 70.

In certain embodiments, the pump system 40 includes the liquid end 42 and the power frame 44. In certain embodiments, the power frame 44 is directly coupled to the power take-off 46. Accordingly, in some embodiments, portions of the pump system 40 are disposed on the transmission 15.

In certain embodiments, disposed within the liquid end 42 is the impeller 110 (See FIG. 8). In certain embodiments, the impeller 110 includes a plurality of vanes 101 and is rotatable around a rotational axis of the drive shaft 92. In certain embodiments, the impeller 110 comprises a disk 100, as well as the plurality of vanes 101 mounted on the disk 100. In certain embodiments, the plurality of vanes 101 are made from a metal or plastic. In certain embodiments, the power take-off 46 and the pump system 40 are aligned so as to rotate about a common axis.

As explained above, in certain embodiments, the power take-off 46 drives the impeller 110. In certain embodiments, the term "centripetal pumps" refers to those rotational pumps in which the fluid to be delivered flows in the direction of the rotational axis of the drive shaft 92 and the impeller 110, and leaves the liquid end 42 in a radial or tangential direction via the pump outlet 72.

In certain embodiments, a pump outlet pipe 74 is in flow communication with the pump outlet 72 and directs the high pressure flow of liquid to one or more control valves 78.

In certain embodiments, the pump system 40 comprises one or more fittings 108, 112. In certain embodiments, the one or more fittings 108, 112 are configured to grip an inside diameter of a tube and seal the connection. The fitting 108, 112 can comprise a smooth end, a threaded end, a hose barb, or other connection structure. For example, a hose barb can comprise one or more continuous ridges or bumps. As a tube is installed on the hose barb, the tube expands over the barb. Grip and seal occur as the tube tries to relax to its original inside diameter behind the barb. In the illustrated embodiment, the pump system 40 comprises two fittings 108, 112 configured as hose barbs. Of course the disclosure is not limited to the illustrated configuration and can instead include other types of fittings known to a person having ordinary skill in the art.

Figure 17:
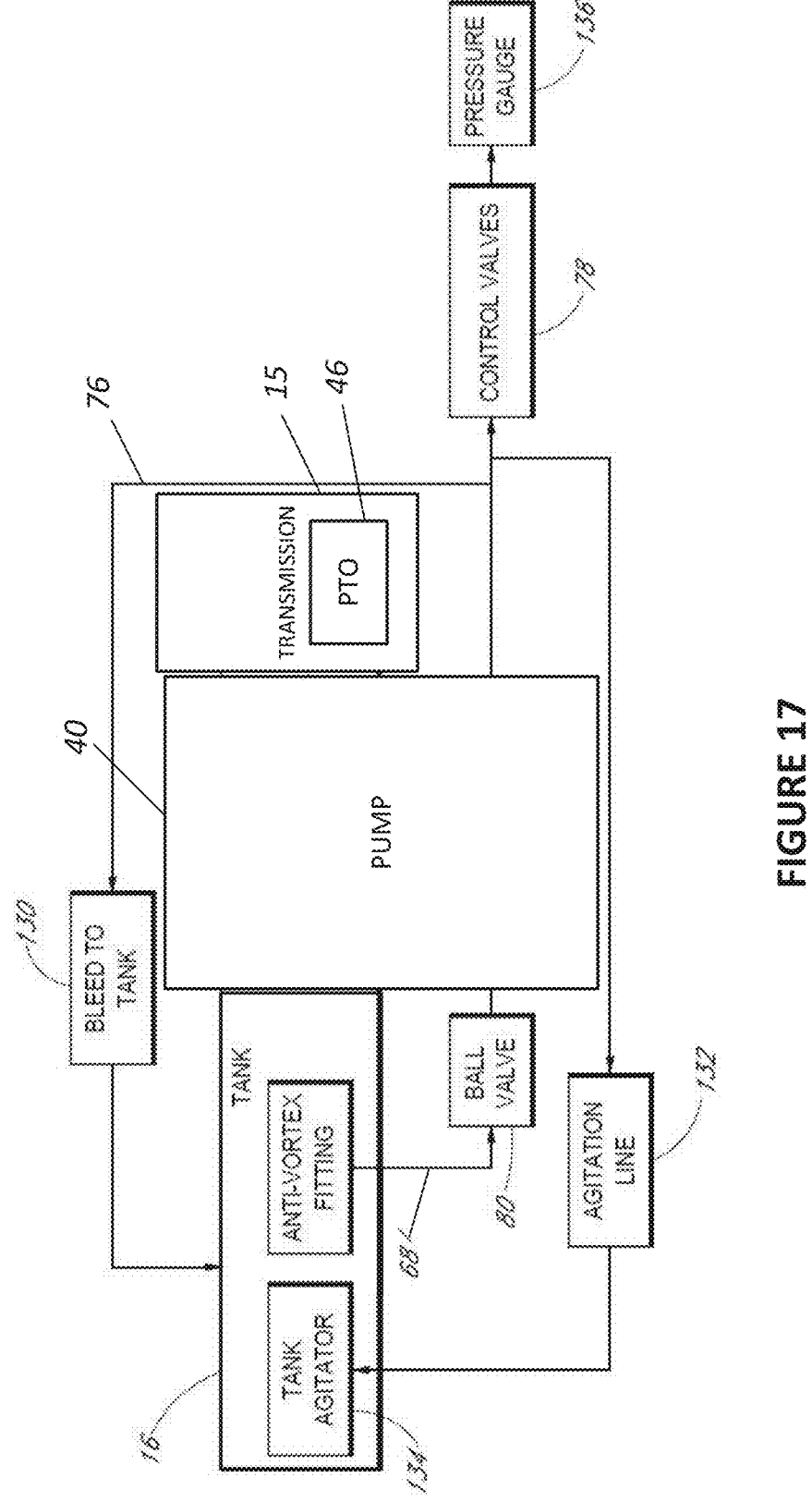
FIG. 17 is a schematic view of exemplary fluid flow paths to and from the pump system of FIG. 2.

In certain embodiments, the pump system 40 includes a bypass line 76 (FIG. 17). The bypass line 76 allows a user to route a portion of the liquid exiting the tank 16 away from the one or more control valves 78. In certain embodiments, the user controls a valve (not shown) to control the volume of liquid entering the bypass line 76. In certain embodiments, the redirected flow through the bypass line 76 is fed back to the tank 16.

Figure 10:
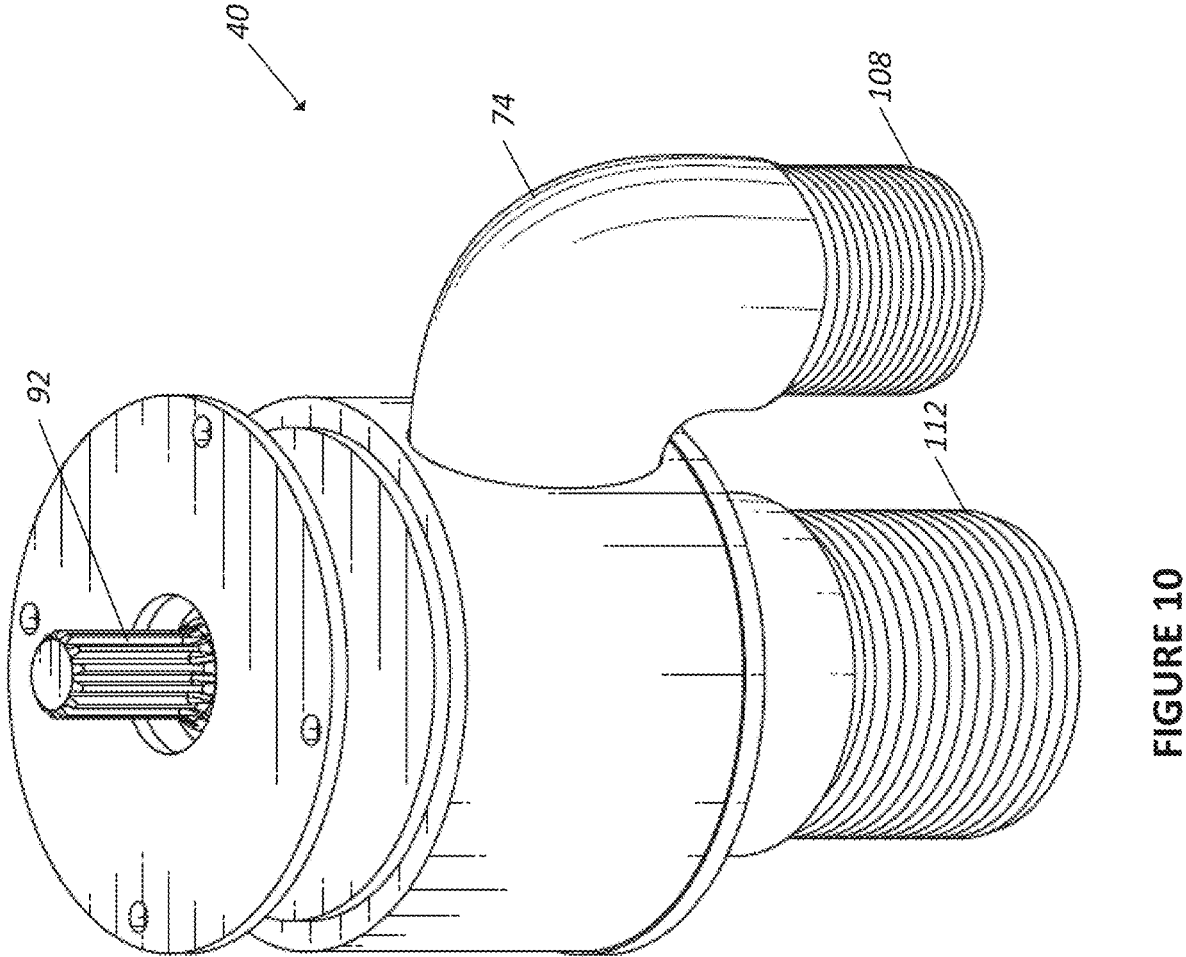
FIG. 10 is a perspective end view of the pump system from FIG. 9 showing a shaft driven by the power take-off.
Figure 11:
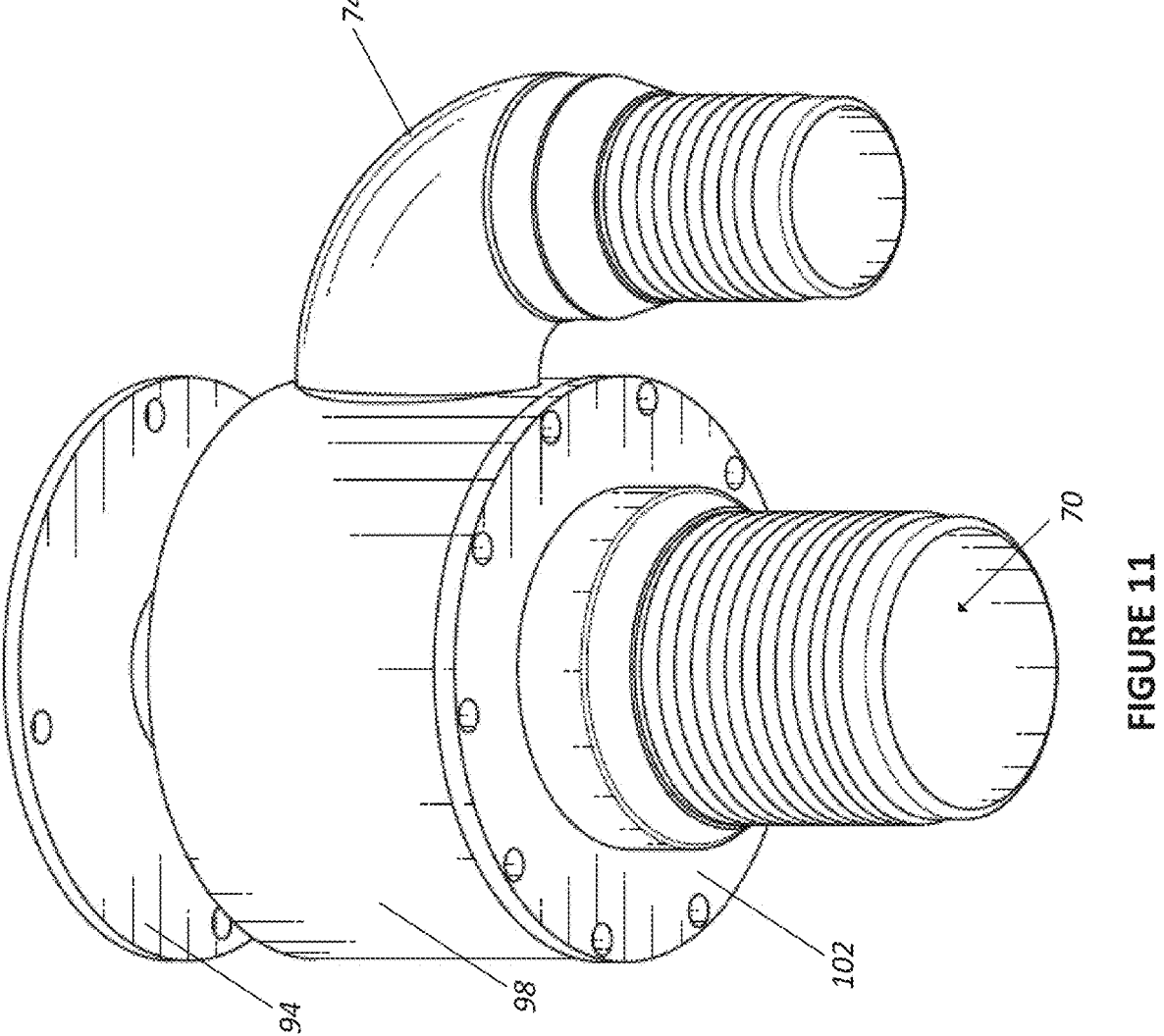
FIG. 11 is a perspective end view of the pump system from FIG. 10 showing a pump inlet of the pump.
Figure 12:
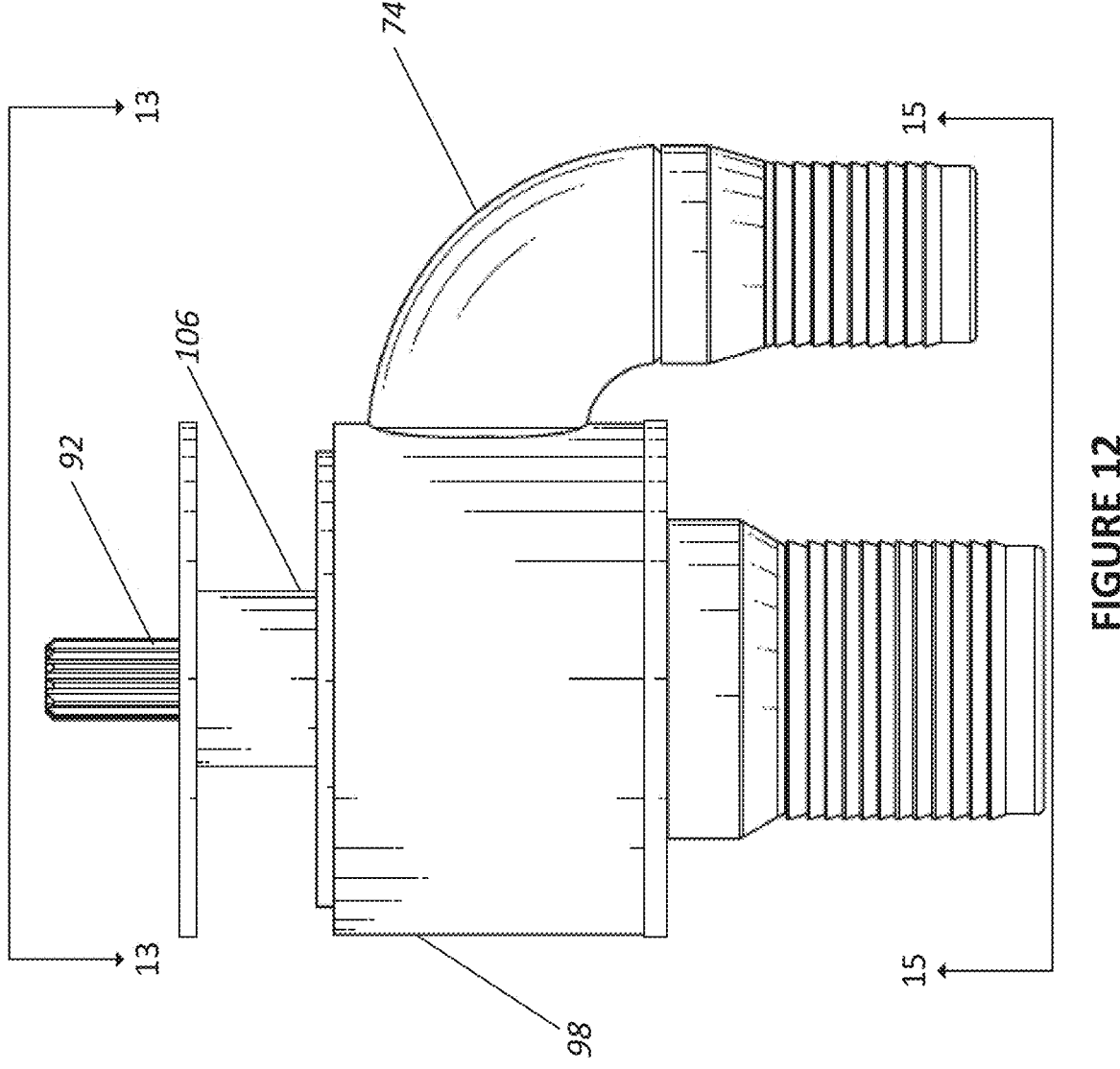
FIG. 12 is a side plan view of the pump system from FIG. 10.

FIG. 10 is a perspective end view of the pump system 40 from FIG. 9 showing the drive shaft 92 configured to be driven by the power take-off 46. FIG. 11 is a perspective end view of the pump system 40 from FIG. 10 showing the pump inlet 70 of the pump. FIG. 12 is a side plan view of the pump system 40 from FIG. 10. In certain embodiments, the liquid end 42 of the pump system 40 is offset a distance away from the power frame 44. Of course, in certain embodiments, the offset can be reduced or removed.

The flow entering the pump inlet pipe 68 then passes through a valve 80. In this way, in certain embodiments, a user can control the volume of liquid flowing from the tank 16 to the pump inlet pipe 68. In certain embodiments, the flow of liquid from the tank 16 is drawn from the tank 16 via the tank outlet. More specifically, in certain embodiments, gravity in combination with rotation of the impeller 110 within the liquid end 42 draws the liquid from the tank 16. In certain embodiments, the flow entering the tank outlet then passes through the valve 80 before entering the pump system 40. In this way, in certain embodiments, a user can control the volume of liquid flowing from the tank 16 to the pump system 40. In certain embodiment, the valve 80 is a gate valve. In other embodiments, the valve 80 is a ball valve or any other type of valve known to a person having ordinary skill in the art.

In certain embodiments, the flow from the pump inlet pipe 68 enters the liquid end 42 of the pump system 40 via the pump inlet 70. In certain embodiments, the pump inlet pipe 68 and the pump inlet 70 can be connected via any conventional means known in the art. Of course, the described pipes and their connections are only exemplary and other arrangements of pipes are contemplated and fall within the disclosure herein.

Figure 13:
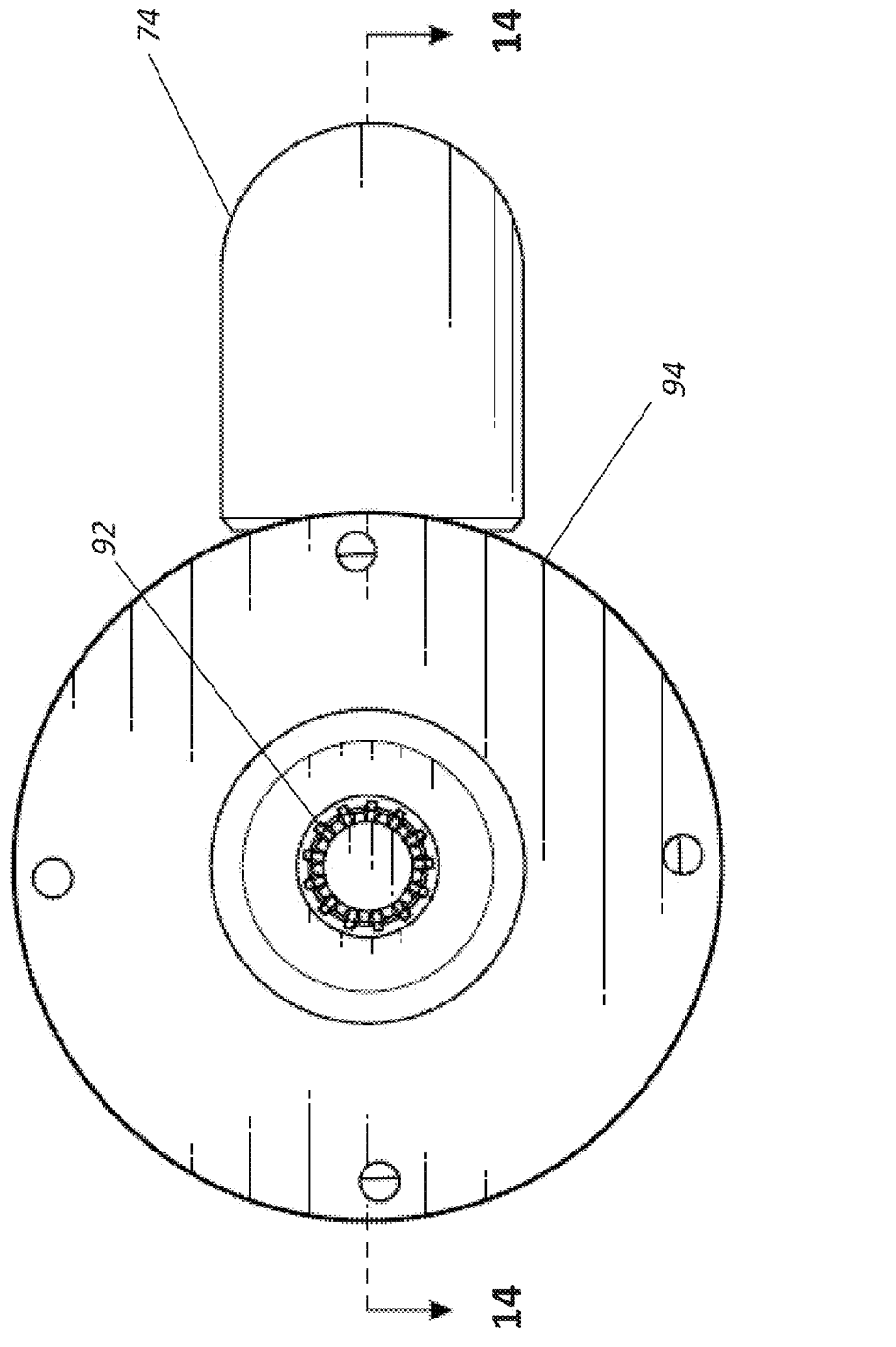
FIG. 13 is an end view of the pump system taken along lines 13-13 of FIG. 12 showing the shaft driven by the power take-off.

FIG. 13 is an end view of the pump system 40 taken along lines 13-13 of FIG. 12 showing the drive shaft 92 driven by the power take-off 46. FIG. 14 is a cross-section view along lines 14-14 in FIG. 13. The pump system 40 generally includes the liquid end 42 and the power frame 44. In certain embodiments, the pump system 40 includes the drive shaft 92 which is in rotational engagement with the impeller 110 in the liquid end 42 and the power take-off 46 in the power frame 44.

Figure 15:
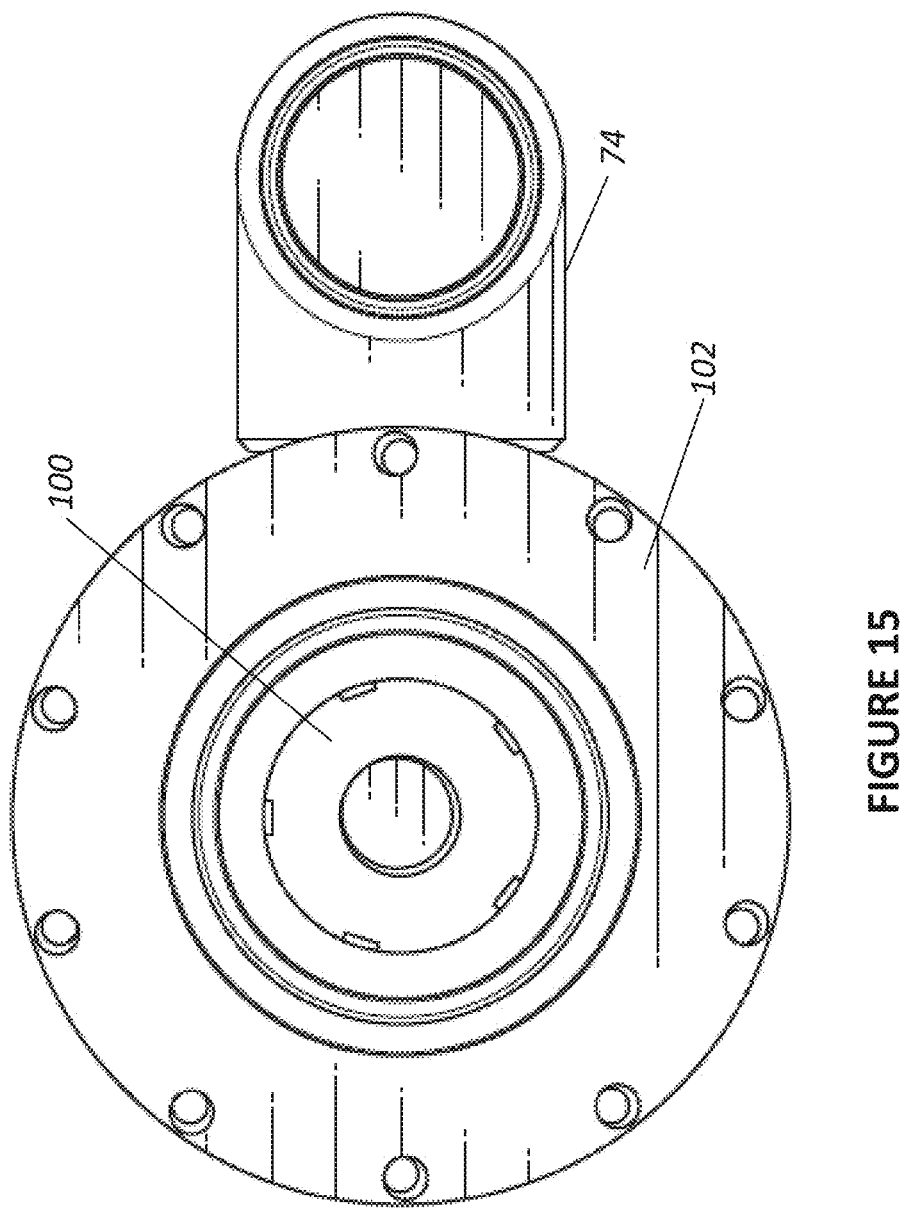
FIG. 15 is a end view of the pump system taken along lines 15-15 of FIG. 12.
Figure 16:
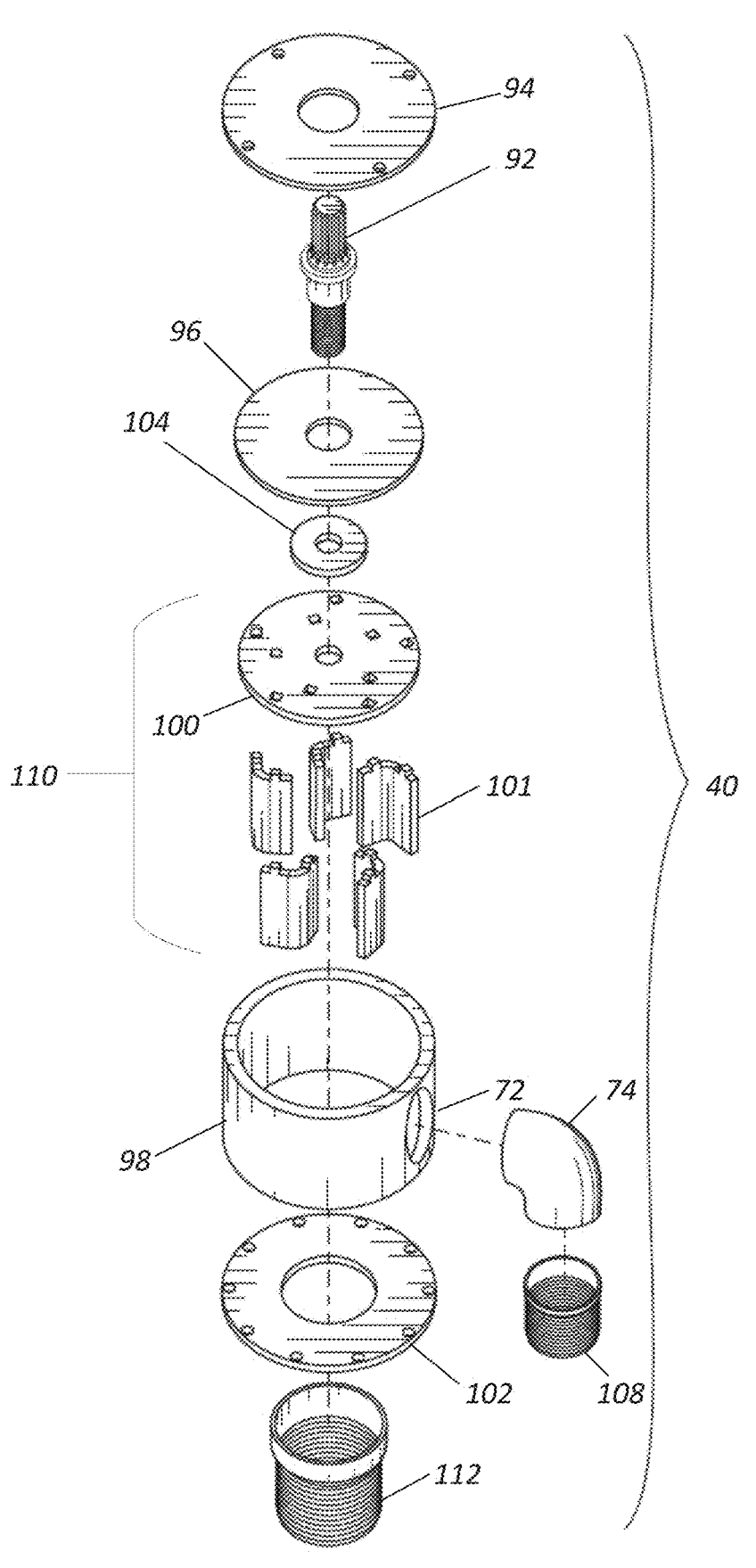
FIG. 16 is an exploded view of the pump system from FIG. 10.

FIG. 15 is a end view of the pump system 40 taken along lines 15-15 of FIG. 12. In FIG. 15, the plurality of vanes 101 have been removed from a rotating disk 100 for clarity. FIG. 16 is an exploded view of the pump system 40 from FIG. 10. In certain embodiments, the power frame 44 includes an adapter 94. In certain embodiments, the adapter 94 can be used in part to secure the power frame 44 to the power take-off 46. In certain embodiments, the adapter 94 secures to a surface or plate disposed on the power take-off 46.

In certain embodiments, the power frame 44 includes the drive shaft 92.

In certain embodiments, the pump system 40 comprises a plate 96 which is attached to an end of a casing 98 so as to form a housing for the impeller 110. In certain embodiments, one or more rings can be employed to secure and seal the plate 96 to the casing 98 so as to prevent leakage there between. In the illustrated embodiment, the impeller 110 comprises a rotating disk 100 and the plurality of vanes 101.

In certain embodiments, the pump system 40 comprises a cover 102. The cover 102 can be removed to access the impeller 110 within the housing. In certain embodiments, the cover 102 is secured to the casing 98 via one or more fasteners.

In certain embodiments, one or more bearings 104 are disposed about the drive shaft 92. In certain embodiments, the one or more bearings 104 hold the drive shaft 92 within the pump system 40 and transfer radial loads experienced by the drive shaft 92 to the pump system 40. In this way, in certain embodiments, the one or more bearings 104 provide for free rotation of the drive shaft 92 about the axis of the drive shaft 92. In certain embodiments, the one or more bearings 104 is a rotary bearing.

In certain embodiments, a seal is disposed about the bearing 106. In certain embodiments, the seal is a gland seal. In other embodiments, the seal is configured as a mechanical seal or any other type of seal known to a person having ordinary skill in the art. In certain embodiments, configuring the seal as a gland seal can provide an advantage of being less susceptible to leaking if sand or other debris enters the seal and/or contacts the drive shaft 92.

In certain embodiments, a spacer 106 (FIG. 14) is disposed around a portion of the drive shaft 92 between the adapter 94 and the plate 96.

FIG. 17 is a schematic view of exemplary fluid flow paths to and from the pump system 40 of FIG. 2. In certain embodiments, the pump system 40 comprises the tank outlet. In certain embodiments, the tank outlet is in flow communication with the inside of the tank 16. In certain embodiments, flow entering the tank outlet then passes through the valve 80 before and the pump inlet pipe 68. In certain embodiments, the flow from the pump inlet pipe 68 enters the liquid end 42 of the pump system 40.

In certain embodiments, the pump system 40 includes the bypass line 76. In certain embodiments, the bypass line 76 allows a user to route a portion of the liquid exiting the tank 16 away from the control valves 78. In certain embodiments, the user controls a valve (not shown) to control the volume of liquid entering the bypass line 76. In certain embodiments, the redirected flow through the bypass line 76 is fed back to the tank 16.

In certain embodiments, the pump system 40 includes a bleed to tank line 130. In certain embodiments, the bleed to tank line 130 can route flow of liquid from the bypass line 76 back to the tank 16. In certain embodiments, the bypass line 76 allows a user to route a portion of the liquid exiting the tank 16 away from the control valves 78. In certain embodiments, the user controls a valve (not shown) to control the volume of liquid entering the bypass line 76.

In certain embodiments, the pump system 40 includes an agitation line 132 and a tank agitator 134 disposed in the tank 16. In certain embodiments, the agitation line 132 can route high pressure flow exiting the liquid end 42 back to the tank 16. In this way, in certain embodiments, excess liquid exiting the liquid end 42 is returned to the tank 16. In certain embodiments, a pressure relief or other design valve can be employed in the agitation line 132. In certain embodiments, the pump system 40 includes a pressure gage 136 to monitor the pressure of the liquid exiting the liquid end 42.

In certain embodiments, a spray system having spray booms (not shown) is employed downstream of the control valves 78. In this way, the truck 10 can transport and pump liquid from inside the tank 16 and spray or expel the pumped liquid at high pressure from the spray booms.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Several illustrative examples of tanks have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can included in any example.

In summary, various examples of pump systems and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above but should be determined only by a fair reading of the claims.

What is claimed is:

1. A pump system configured to couple to a power take-off of a vehicle, the pump system comprising:
    a water pump having a drive shaft, the drive shaft having a first end and a second end, the first end being configured to extend into and engage with the power take-off of the vehicle, the second end being configured to extend into and engage with the water pump, the water pump being sized and shaped to be disposed under the vehicle, wherein the water pump is directly coupled to and in proximity of the power take-off without being installed on a frame or chassis of the vehicle; and
    a spacer configured to extend from the water pump to the power take-off,
    wherein the drive shaft passes through the spacer.

2. The pump system of claim 1, further comprising an adapter configured to secure the pump system to the power take-off.

3. The pump system of claim 1, further comprising a housing.

4. The pump system of claim 3, wherein the housing comprises a plate and a casing.

5. The pump system of claim 1, further comprising an impeller.

6. The pump system of claim 5, wherein the impeller comprises a rotating disk and a plurality of vanes.

7. The pump system of claim 1, wherein the water pump is a centripetal pump.

8. The pump system of claim 1, wherein the water pump is a rotary pump.

9. The pump system of claim 1, wherein the water pump further comprises a removable cover.

10. The pump system of claim 1, further comprising a bearing disposed about the shaft.

11. A pump system configured to couple to a power take-off of a vehicle, the pump system comprising:
    a water pump having a drive shaft and a liquid end, the drive shaft having a first end and a second end, the first end being configured to extend into and engage with the power take-off of the vehicle, the second end being configured to extend into and engage with the liquid end so as to drive an impeller, the water pump being sized and shaped to be disposed under the vehicle, wherein the water pump is directly coupled to and in proximity of the power take-off without being installed on a frame or chassis of the vehicle; and
    a spacer configured to extend from the water pump to the power take-off,
    wherein the drive shaft passes through the spacer.

12. The pump system of claim 11, wherein the impeller comprises a rotating disk and a plurality of vanes.

13. The pump system of claim 11, wherein the water pump is a centripetal pump.

14. The pump system of claim 11, wherein the water pump is a rotary pump.

15. A pump system configured to couple to a power take-off of a vehicle, the pump system comprising:
    a drive shaft having a first end and a second end, the first end being configured to extend into and engage with the power take-off of the vehicle;
    a water pump configured to surround the second end of the drive shaft and having an impeller, the impeller being driven by the second end of the drive shaft;
    a pump inlet pipe configured to route water from a tank on the vehicle to the impeller; and
    an outlet pipe configured to route the water exiting the water pump to one or more control valves of the vehicle,
    wherein the water pump is directly coupled to and in proximity of the power take-off without being installed on a frame or chassis of the vehicle; and
    a spacer configured to extend from the water pump to the power take-off,
    wherein the drive shaft passes through the spacer.

16. The pump system of claim 15, wherein the pump system has a compact size configured to fit under the vehicle.

17. The pump system of claim 15, further comprising the power take-off, wherein the power take-off is configured to engage with a transmission of the vehicle.

18. The pump system of claim 17, wherein the power take-off and the pump system are aligned so as to rotate about a common axis.

19. The pump system of claim 17, wherein the power take-off attaches to the transmission via one or more fasteners and engages with one or more gears of the transmission.

* * * * *